No. 661,364. Patented Nov. 6, 1900.
O. C. BOTZ.
FOLDING FLASH LIGHT BRACKET.
(Application filed Mar. 14, 1900.)
(No Model.)
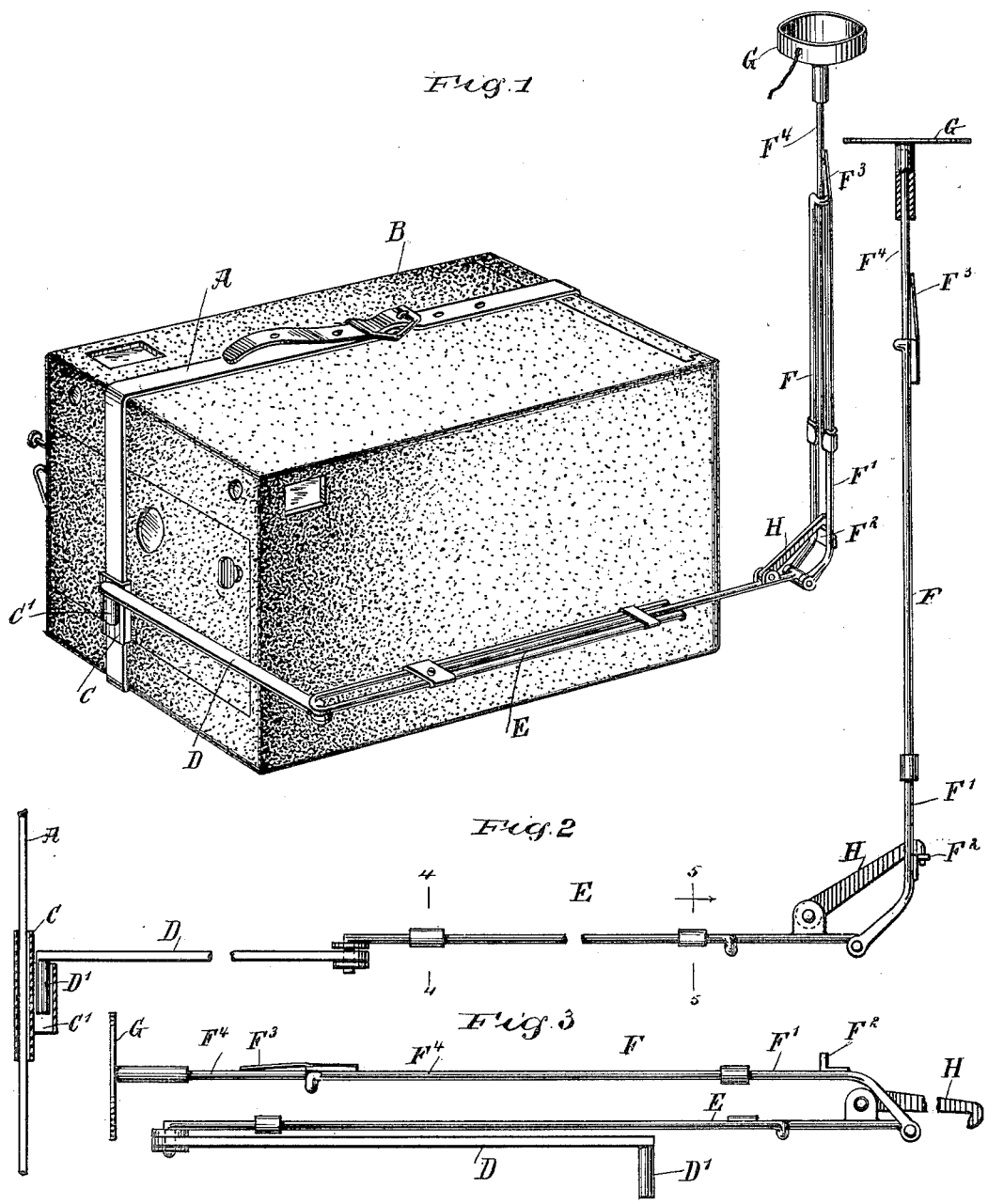

UNITED STATES PATENT OFFICE.

OTTO CARL BOTZ, OF SEDALIA, MISSOURI.

FOLDING FLASH-LIGHT BRACKET.

SPECIFICATION forming part of Letters Patent No. 661,364, dated November 6, 1900.

Application filed March 14, 1900. Serial No. 8,637. (No model.)

*To all whom it may concern:*

Be it known that I, OTTO CARL BOTZ, a citizen of the United States, and a resident of Sedalia, in the county of Pettis and State of Missouri, have invented a new and Improved Folding Flash-Light Bracket, of which the following is a full, clear, and exact description.

The object of the invention is to provide a new and improved folding flash-light bracket which is simple and durable in construction, arranged for convenient attachment to a camera to support the flash-light material in proper position, and so constructed as to be capable of being folded into a comparatively small space when not in use.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement as applied. Fig. 2 is an enlarged side elevation of the improvement with parts in section. Fig. 3 is a similar view of the same shown detached from the camera and folded up. Fig. 4 is an enlarged cross-section of one of the members of the bracket, the section being on the line 4 4 in Fig. 2; and Fig. 5 is a similar view of the same part, the section being on the line 5 5 in Fig. 2.

On the strap A, surrounding the camera B, is arranged a sleeve C, formed with a socket C', adapted to be engaged by a pivot-pin D', formed on one end of a transverse bar D, extending at one side of the camera B, as is plainly indicated in Fig. 1. On the free end of the bar D is pivoted an extension-rod E of any approved construction, adapted to swing in a horizontal direction and adapted to be extended or shortened by moving its sections accordingly, and on the free end of the extension-rod E is fulcrumed an extension-upright F, carrying at its upper end a pan or disk G for supporting the flash-light material.

On the movable member of the rod E is fulcrumed a hook H, adapted to engage a cross-bar $F^2$ on the fixed member F' of the extension F to permit of locking the said upright in position when the device is to be used as illustrated in Figs. 1 and 2. When the hook H is disengaged from the cross-bar $F^2$, then the upright F may be folded down upon the rod E, as indicated in Fig. 3. The fixed member F' of the upright F is provided at its upper end with a spring $F^3$ in frictional contact with the movable member $F^4$ of the said upright, so that when the members are extended the frictional contact of the spring $F^3$ with the member $F^4$ holds the latter in an extended position.

From the foregoing it is evident that the device can be readily applied to the camera or removed therefrom by simply lifting the bar D, with its pin D', out of the socket C', and when the device is in use and supported from the camera by the socket C', slide C, and strap A then the pan or disk G, carrying the flash-light, can be brought into the desired position relatively to the object to be illuminated and photographed by the use of the camera. It is evident that by the arrangement described the construction of the bar D and rod E allows lateral adjustment of the pan or disk G relatively to the camera, and the pan or disk can be raised or lowered by adjusting the members of the upright F accordingly.

Having thus fully described my invention, I claim as new and desire to secure by Letters Patent—

1. A folding flash-light bracket, comprising a supporting-bar for attachment to a socket on the camera, an extension-rod fulcrumed on the supporting-bar, an extension-upright consisting of telescopic sections for carrying the flash-light material, said upright being pivotally connected with said extension-rod, to fold thereon, a spring for holding the sections as adjusted and means for locking the said upright in a vertical position relatively to the said extension-rod, substantially as shown and described.

2. A folding flash-light bracket, comprising a socket on a camera, a bar pivotally connected therewith and adapted to swing horizontally, an extension-rod pivoted on the free end of said bar to swing in a horizontal direction, an upright pivoted on the free end of the said rod, and carrying at its upper end means for supporting the flash-light material, and a hook fulcrumed on the extension-rod and adapted to engage the extension-upright, to lock the latter in a vertical position relatively to the rod, as set forth.

3. A folding flash-light bracket, comprising a socket on a camera, a bar pivotally connected therewith and adapted to swing horizontally, an extension-rod pivoted on the free end of said bar to swing in a horizontal direction, an upright consisting of sliding members pivoted on the free end of the said rod, and carrying at its upper end means for supporting the flash-light material, a hook fulcrumed on the extension-rod and adapted to engage the extension-upright, to lock the latter in a vertical position relatively to the rod, and means for holding the members of the upright in an extended position, as set forth.

In testimony whereof I have signed my name to this specification in the presence of two subscribing witnesses.

OTTO CARL BOTZ.

Witnesses:
CHAS. J. BOTZ,
CHRIS. LANGE.